United States Patent [19]

Clementini et al.

[11] Patent Number: 4,578,428

[45] Date of Patent: Mar. 25, 1986

[54] MODIFIED OLEFINE POLYMERS AND PROCESS FOR THEIR MANUFACTURE

[75] Inventors: Luciano Clementini; Leonardo Spagnoli, both of Terni, Italy

[73] Assignee: Montedison S.p.A., Milan, Italy

[21] Appl. No.: 561,995

[22] Filed: Dec. 16, 1983

[51] Int. Cl.[4] .................. C08F 255/02; C08F 255/04; C08F 8/06

[52] U.S. Cl. .................................. 525/265; 525/263; 525/301; 525/322; 525/323; 525/904

[58] Field of Search ................ 525/904, 263, 265, 301

[56] References Cited

U.S. PATENT DOCUMENTS

| | | | |
|---|---|---|---|
| 3,177,269 | 4/1965 | Nowak et al. | 525/263 |
| 3,458,597 | 7/1969 | Jabloner | 525/301 |
| 3,987,122 | 10/1976 | Bartz et al. | 525/301 |
| 4,507,423 | 3/1985 | Sasaki et al. | 525/263 |

FOREIGN PATENT DOCUMENTS

| | | | |
|---|---|---|---|
| 0158248 | 1/1983 | Fed. Rep. of Germany | 525/265 |
| 47-8220 | 3/1972 | Japan | 525/904 |
| 0783790 | 10/1957 | United Kingdom | 525/265 |

*Primary Examiner*—Wilbert J. Briggs, Sr.

[57] ABSTRACT

Olefinic polymers characterized by the presence of free carboxylic groups arranged along the polymeric chain, obtained by radicalic grafting of unsaturated carboxylic acids onto the chain of the olefinic polymer. The products so obtained exhibit in particular a high adhesion to metals. The manufacturing process is based on the use of at least two different organic peroxides, having different reactivities.

8 Claims, No Drawings

MODIFIED OLEFINE POLYMERS AND PROCESS FOR THEIR MANUFACTURE

THE PRIOR ART

In the technical and patent literature there is described the grafting of unsaturated acids on polypropylene, through the formation of radicals caused by radiations (beta rays, gamma rays, electric discharges, electron beams) or by radicalic starters, such as oxygen, ozone, peroxides, azocompounds, or by heating to high temperatures, in a vapor phase. U.S. Pat. No. 3,987,122 describes the grafting of unsaturated acids on olefinic polymers through the action of organic peroxides at high temperature in the mixture of olefinic polymer and of unsaturated acid. The resulting products are suitable as hot melts because of their properties of adhesion to the metals.

According to said method, the grafting is accomplished directly during the extrusion of the olefinic polymer in admixture with the unsaturated acid, employing as starters organic peroxides having an average life of 10 hours at temperatures higher than 80° C., such as dicumyl peroxide, ter.butyl-benzoate peroxide, 2,5-dimethyl-2,5-di-ter.butyl-peroxy-3-hexyne,$\alpha,\alpha$-bis(ter.-butyl-peroxy)-di-isopropyl-benzene.

Under these conditions, however, remarkable homopolymerization of the unsaturated acid occurs, along with formation of a structure endowed with few and very long acid side chains, to the detriment of the adhesion properties of the polymer.

THE PRESENT INVENTION

A new process has been now found, which is the object of the present invention, for grafting unsaturated carboxylic acids on olefinic polymers and copolymers, in the absence of solvents, consisting essentially in a preliminary peroxidation of the olefinic polymer, such peroxidation being obtained by treating the polymer in the form of granules in a mixer for powders, of the quick type, at temperatures of 70°–120° C. for times ranging from 10 to 100 minutes, such limits of time being respectively referred to the maximum temperature and to the minimum temperature, with an organic peroxide having an average life lower than 30 minutes at 100° C.

Successively, the so peroxidized olefinic polymer is mixed, at a temperature not exceeding 220° C., with the unsaturated carboxylic acid and with an organic peroxide having an average life $\leq 30$ seconds at 200° C.

Grafting of the unsaturated acid onto the previously peroxidized polyolefinic chain is accomplished by bringing the above-obtained mixture to a temperature of the order of 180°–220° C. for a few seconds.

The peroxide of the second type, utilized in the grafting step, may be also additioned to the starting polymer, along with the first-type peroxide. This operating modality proves advantageous in practice because a more homogeneous and complete incorporation of the second-type peroxide into the polymeric material is obtained.

As peroxides to be used in the first step there are suitable, e.g.: lauroyl peroxide, benzoyl peroxide, p-chlorobenzoyl peroxide, decanoyl, peroxide, and the like.

The peroxide amount employed is of the order of 0.1 to 0.5 g/100 g of polymer.

As a peroxide to be introduced into the 2nd step and which is utilized in the successive grafting of the unsaturated acid there are useful, for example: 2,5-dimethyl-2,5-bis(ter.butylperoxy)-hexane, ter.butylperoxide, dicumylperoxide, di-ter.butylbenzoate peroxide and the like.

The amount of peroxide employed is of the order of 0.01–0.1 g/100 g of olefinic polymer.

As an unsaturated acid to be grafted on the polyolefinic chain, there may be cited, e.g.: acrylic acid, maleic acid, fumaric acid, itaconic acid, methacrylic acid and derivatives thereof. Acrylic acid and methacrylic acid are particularly suited. The unsaturated acid amount to be used is the one generally employed in the production of olefinic polymers modified by grafting of the above-said acids: it is of the order of 0.1–10 g/100 g of olefinic polymer.

The grafting step can be carried out in particular by filling the resulting mixture of preliminarily peroxidized olefinic polymer with unsaturated acid and with organic peroxide in an extruder-granulator operating at the temperature and with a residence time of the polymer as indicated hereinabove.

Polypropylene having prevailingly isotactic macromolecules, the ethylene/propylene crystalline copolymers having a prevailing propylene content, both of the random type and of the block type, prepared by means of stereospecific catalysts, and the like, have proved suitable as modified polyolefins according to this invention.

Unlike the processes of the prior art in which the olefinic polymer and the unsaturated acid were reacted in the presence of a peroxide in one operating step only, the process according to the present invention is characterized by the preliminary peroxidation step of the olefinic polymer with organic peroxides of the type selected for this operation, and by the successive grafting step of the acid in the presence of peroxides of the type selected for this operation.

The operating features of the process according to the invention allow to obtain grafted olefinic polymers having improved properties, in particular a high adhesion to the metals, with high peeling test values, measured according to standard A.S.T.M. D-903/65. On samples consisting of metal plates and modified polyolefins, peel strength measurements were effected after immersion in water at 25° C. for 30 days: the modified polyolefins according to the present invention retain the peeling test values unchanged.

The improved characteristics of the product obtained are to be considered as a consequence of the specific conditions under which the unsaturated acid grafting has been accomplished.

The conditions allow to reduce to the minimum the homopolymerization of the unsaturated acid and to effect the grafting of the same in many sites of the polyolefinic chain, thus achieving a structure in which the acid side chains are several and very short.

Wide variations and modifications may be brought to the details of the present invention when practicing it, without departing however from the spirit and the scope thereof.

The following examples are given to illustrate the invention, however without limiting it.

EXAMPLE 1

Into a stainless steel quick-type mixer, having a 10 l capacity there were introduced:

polypropylene in flakes: 2 kg
lauroyl peroxide: 6 g
2,5-dimethyl-2,5-bis(ter.butylperoxide)-hexane: 1 g
The polypropylene exhibited:
an inherent viscosity of 2.28 dl/g
a residue of the extraction with heptane of 97.9%.

It was mixed 1 hour at 110° C. After this treatment, the polymer exhibited —OOH=0.07%±0.01% by weight and an inherent viscosity of 1.5 dl/g.

The temperature was lowered down to 30° C., and 40 g of acrylic acid were then introduced.

It was mixed at 30° C. for 20 minutes, whereafter the polymer was discharged and granulated at 200° C. in a 45 mm single-screw extruder. The residence time of the material in the extruder was 30 seconds.

The resulting granulated product exhibited —COOH=1.2% by weight, equal to 1.92% of acrylic acid.

Plates prepared in a press at 200° C. for 5 minutes starting from two aluminum plates (100 micron thick), with interposition of grafted polymer, exhibited a peel strength (peeling test) of 2 kg/cm+0.2.

After a 30-day immersion in water, at 25° C., the peeling test value remained unchanged.

EXAMPLE 2

Into a stainless steel quick-type mixer, having a capacity of 10 l, there were introduced:
propylene/ethylene copolymer: 2 kg
lauroyl peroxide: 6 g
2,5-dimethyl-2,5-bis(ter.butylperoxide)-hexane: 1 g
The propylene/ethylene random copolymer exhibited:
an inherent viscosity of 3.6 dl/g
an ethylene content of 5.0% by weight.

It was mixed 1 hour at 90° C. After such treatment the polymer exhibited —OOH=0.04% by weight.

Temperature was decreased to 30° C., and 40 g of acrylic acid were introduced.

It was mixed at 30° C. for 20 minutes, then the polymer was discharged, and it was granulated at 200° C. in a single-screw extruder of 45 mm.

The obtained granulated product exhibited —COOH=1.0% by weight, corresponding to 1.6% of acrylic acid.

Plates prepared in a press at 200° C. for 5 minutes starting from two aluminium plates (100μ thickness), with interposition of grafted polymer, exhibited a peel strength (peeling test) of 2 kg/cm±0.2.

After a 30-day immersion in water at 25° C., the peeling test value remained unchanged.

EXAMPLE 3

Into a stainless steel quick-type mixer, having a 10-liter capacity, there were introduced:
polypropylene in flakes: 2 kg
lauroyl peroxide: 6 g
2,5-dimethyl-2,5-bis(ter.butylperoxy)-hexane: 1 g
The polypropylene exhibited:
an inherent viscosity of 2.28 dl/g
a residue to the extraction with heptane of 97.9%.

It was mixed for 1 hour at 110° C. After this treatment, the polymer exhibited —OOH=0.07%±0.01 and [η]=1.5.

The temperature was lowered to 30° C., and 80 g of acrylic acid were introduced.

It was mixed at 30° C. for 20 minutes, then the polymer was discharged, and it was granulated at 200° C. in a single-screw 45-mm extruder.

The obtained granulated product exhibited —COOH=2.2% by weight, corresponding to 3.5% of acrylic acid.

Plates prepared in a press at 200° C. for 5 minutes starting from two aluminium plates (100μ thick), with interposition of grafted polymer, exhibited a peel strength (peeling test) equal to 2 kg/cm±0.2.

After a 30-day immersion in water at 25° C., the peeling test value remained unchanged.

EXAMPLE 4

Into a stainless steel quick-type mixer having a capacity of 10 liters, there were introduced:
polypropylene in flakes: 2 kg
lauroyl peroxide: 6 g
2,5-dimethyl-2,5-bis(ter.-butylperoxy)-hexane: 1 g
The polypropylene exhibited:
an inherent viscosity of 2.28 dl/g
a residue of the extraction with heptane of 97.9%.

It was mixed 1 hour at 110° C. After this treatment the polymer exhibited —OOH=0.07%±0.01 and [η]=1.5.

The temperature was decreased to 30° C., and 10 g of acrylic acid were introduced.

It was mixed at 30° C. for 20 minutes, whereupon the polymer was discharged and it was granulated at 200° C. in a 45 mm single-screw extruder.

The granulated product obtained exhibited —COOH=0.3% by weight, corresponding to 0.48% of acrylic acid.

Plates prepared in a press at 200° C. for 5 minutes starting from two aluminium plates (thickness: 100μ), with interposition of grafter polymer, exhibited a peel strength (peeling test) equal to 1.6 kg/cm±0.2.

After a 30-day immersion in water at 25° C., the peeling test value remained unchanged.

EXAMPLE 5

Into a stainless steel quick-type mixer, having a 10-liter capacity, there were introduced:
polypropylene in flakes: 2 kg
benzoyl peroxide: 6 g
2,5-dimethyl-2,5-bis(ter.butylperoxy)-hexane: 1 g
The polypropylene exhibited:
an inherent viscosity of 2.28 dl/g
a residue of the extraction with heptane of 97.9%.

It was mixed 1 hour at 110° C. After this treatment the polymer exhibited —OOH=0.072 and an inherent viscosity of 1.6 dl/g. The temperature was decreased to 30° C., and 40 g of acrylic acid were introduced.

It was mixed at 30° C. for 20 minutes, then the polymer was discharged and it was granulated at 200° C. in a 45 mm single-screw extruder.

The granulated product obtained exhibited —COOH=1.25% by weight, corresponding to 2% of acrylic acid.

Plates prepared in a press at 200° C. for 5 minutes starting from two aluminium plates (thickness: 100μ), with interposition of grafted polymer, exhibited a peel strength (peeling test) of 2.2 kg/cm.

After a 30-day immersion in water at 25° C., the peeling test value remained unchanged.

EXAMPLE 6

Into a stainless steel quick-type mixer having a 10-liter capacity there were introduced:
polypropylene in flakes: 2 kg
lauroyl peroxide: 6 g
2,5-dimethyl-2,5-bis(ter.butylperoxide)-hexane: 0.6 g
The polypropylene exhibited:
an inherent viscosity of 2.28 dl/g
a residue of the extraction with heptane of 97.9%

It was mixed 1 hour at 110° C. After this treatment the polymer exhibited —OOH=0.07%±0.01 and $[\eta]=1.5$.

The temperature was decreased to 30° C., and 40 g of acrylic acid were introduced.

It was mixed at 30° C. for 20 minutes, then the polymer was discharged and it was granulated at 200° C. in a 45 mm single-screw extruder.

The obtained granulated product exhibited —COOH=1.0% by weight, corresponding to 1.6% of acrylic acid.

Plates prepared in a press at 200° C. for 5 minutes starting from two aluminium plates (thickness: 100μ), with interposition of grafted polymer, exhibited a peel strength (peeling test) of 1.4 kg/cm±0.2.

After a 30-day immersion in water at 25° C., the peeling test value remained unvaried.

EXAMPLE 7

Into a stainless steel quick-type mixer having a 10-liter capacity there were introduced:
polypropylene in flakes: 2 kg
lauroyl peroxide: 6 g
2,5-dimethyl-2,5-bis(ter.butylperoxide)-hexane: 1 g
The polypropylene exhibited:
an inherent viscosity of 2.28 dl/g
a residue of the extraction with heptane of 97.9%.

It was mixed 1 hour at 110° C. After this treatment, the polymer exhibited —OOH=0.07%±0.01 and $[\eta]=1.5$.

The temperature was lowered to 30° C., and 10 g of acrylic acid were introduced.

It was mixed at 30° C. for 20 minutes, then the polymer was discharged, and it was granulated at 190° C. in a 45 mm single-screw extruder.

The obtained granulated product exhibited —COOH=0.37% by weight, corresponding to 0.59% of acrylic acid.

Plates prepared in a press at 200° C. for 5 minutes starting from two aluminium plates (thickness: 100μ), with interposition of grafted polymer, exhibited a peel strength (peeling test) of 1.7 kg/cm±0.2.

After a 30-day immersion in water at 25° C., the peeling test value remained unchanged.

EXAMPLE 8

Into a stainless steel quick-type mixer having a 10-liter capacity, there were introduced:
polypropylene in flakes: 2 kg
lauroyl peroxide: 6 g
2,5-dimethyl-2,5-bis(ter.butylperoxide)-hexane: 1 g
The polypropylene exhibited:
an inherent viscosity of 2.28 dl/g
a residue of the extraction with heptane of 97.9%.

It was mixed 1 hour at 110° C. After this treatment the polymer exhibited —OOH=0.07%±0.01 and $[\eta]=1.5$.

The temperature was decreased to 30° C., and 10 g of acrylic acid were introduced.

It was mixed at 30° C. for 20 minutes, then the polymer was discharged and it was granulated at 220° C. in a single-screw 45 mm extruder.

The obtained granulated product exhibited —COOH=0.60% by weight, corresponding to 0.96% of acrylic acid.

Plates prepared in a press at 200° C. for 5 minutes starting from two aluminium plates (thickness: 100μ), with interposition of grafted polymer, exhibited a peel strength (peeling test) of 1.8 kg/cm±0.2.

After a 30-day immersion in water at 25° C., the peeling test value remained unchanged.

EXAMPLE 9 (COMPARATIVE TEST)

Into a stainless steel slow-type mixer, having a capacity of 30 liters, there were introduced:
polypropylene in flakes: 2 kg
lauroyl peroxide: 6 g
2,5-dimethyl-2,5-bis(ter.butylperoxide)-hexane: 1 g
The polypropylene exhibited:
an inherent viscosity of 2.28 dl/g
a residue of the heptane extraction of 97.9%.

It was mixed 1 hour at 30° C. After this treatment, the polymer was additioned with 40 g of acrylic acid.

It was mixed at 30° C. for 20 minutes, then the polymer was discharged, and it was granulated at 200° C. in a single-screw 45 mm extruder.

The obtained granulated product exhibited —COOH=0.9% by weight, corresponding to 1.44% of acrylic acid.

Plates prepared in a press at 200° C. for 5 minutes starting from two aluminium plates (thickness: 100μ) with interposition of grafted polymer exhibited a peel strength (peeling test) of 0.0 kg/cm.

After a 30-day immersion in water at 25° C., the peeling test value remained unchanged.

EXAMPLE 10 (COMPARATIVE TEST)

Into a stainless steel quick-type mixer having a capacity of 10 liters, there were introduced:
polypropylene in flakes: 2 kg
lauroyl peroxide: 6 g
The polypropylene exhibited:
an inherent viscosity of 2.28 dl/g
a residue of the extraction with heptane of 97.9%.

It was mixed 1 hour at 110° C. After this treatment, the polymer exhibited —OOH=0.07%±0.01 and $[\eta]=1.5$.

The temperature was decreased to 30° C., and 40 g of acrylic acid were introduced.

It was mixed at 30° C. for 20 minutes, then the polymer was discharged, and it was granulated at 200° C. in a single-screw 45 mm extruder.

The obtained granulated product exhibited —COOH=0.6% by weight, corresponding to 0.96% of acrylic acid.

Plates prepared in a press at 200° C. for 5 minutes starting from two aluminium plates (thickness: 100μ) with interposition of grafted polymer, exhibited a peel strength (peeling test) of 0.4 kg/cm±0.2.

After a 30-day immersion in water at 25° C., the peeling test value remained unchanged.

EXAMPLE 11 (COMPARATIVE TEST)

Into a stainless steel quick-type mixer, having a capacity of 10 liters, there were introduced:

polypropylene in flakes: 2 kg
2,5-dimethyl-2,5-bis(ter.butylperoxide)-hexane: 2 g
The polypropylene exhibited:
an inherent viscosity of 2.28 dl/g
a residue of the extraction with heptane of 97.9%

It was mixed 1 hour at 110° C. After this treatment, the polymer exhibited OOH=0.02% by weight.

The temperature was decreased to 30° C., then 40 g of acrylic acid were introduced.

It was mixed at 30° C. for 20 minutes, whereafter the polymer was discharged, and it was granulated at 200° C. in a single-screw 45 mm extruder.

The granulated product obtained exhibited COOH=1.0% by weight, corresponding to 1.6% of acrylic acid.

Plates prepared in a press at 200° C. for 5 minutes starting from two aluminium plates (thickness: 100μ) with interposition of grafted polymer, exhibited a peel strength (peeling test) of 0.5 kg/cm±0.2 (1).

After a 30 day immersion in water at 25° C., the peeling test value remained unchanged.

What we claim is:

1. A process for manufacturing modified polymers consisting of polymers selected from crystalline, prevailingly isotactic polypropylene and crystalline propylene/ethylene copolymers made up, prevailingly, of polymerized propylene units, prepared by means of stereospecific catalysts grafted with unsaturated carboxylic acids, having a high adhesiveness to metals, comprising a preliminary step of peroxidizing the starting polymer or copolymer by means of a treatment at 70°-120° C. with organic peroxide having an average life >30 minutes at 100° C., the successive mixing with the unsaturated carboxylic acid and the grafting reaction of the latter being accomplished in the absence of solvents, at a temperature of 180°-220° C. in the presence of a different organic peroxide having an average life ≦30 seconds at 200° C.

2. The process according to claim 1, characterized in that the actual grafting reaction is accomplished by causing the mixture of polypropylene or propylene-/ethylene copolymer and organic peroxide to pass through a mixer operating at 180°-220° C. and in which the mixture residence time ranges from 20 to 30 seconds.

3. The process according to claim 1, in which the preliminary step of peroxidizing the polypropylene or propylene/ethylene copolymer is carried out by mixing the latter with the peroxide in a mixer for powders, for a time of 10-100 minutes.

4. The process according to claim 1 in which the organic peroxide utilized in the grafting step is added, along with the peroxide utilized in the preliminary peroxidation step, to the starting polypropylene copolymer.

5. The process according to claim 1, in which the peroxide utilized in the preliminary peroxidation step is selected from the group consisting of lauroyl peroxide, benzoyl peroxide, p-chlorobenzoyl peroxide, decanoyl peroxide.

6. The process according to claim 1 in which the peroxide utilized in the grafting step is selected from the group consisting of ter.butylperoxide, 2,5-dimethyl-2,5-bis(ter.butylperoxy)-hexane, dicumylperoxide, di-ter.-butylbenzoate peroxide.

7. The process according to claim 1, in which the starting polymer is a random propylene/ethylene copolymer.

8. The process according to claim 1, in which the starting polymer is a propylene/ethylene block copolymer.

* * * * *